(12) United States Patent
Saito et al.

(10) Patent No.: US 11,321,301 B2
(45) Date of Patent: May 3, 2022

(54) INFORMATION PROCESSING APPARATUS, INFORMATION PROCESSING METHOD, AND INFORMATION PROCESSING SYSTEM

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Hidekazu Saito, Katsushika (JP); Shigeta Kuninobu, Yokohama (JP); Takuma Akagi, Meguro (JP); Koji Ehara, Yokohama (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 120 days.

(21) Appl. No.: 16/814,777

(22) Filed: Mar. 10, 2020

(65) Prior Publication Data
US 2021/0004362 A1    Jan. 7, 2021

(30) Foreign Application Priority Data

Jul. 4, 2019  (JP) .............................. JP2019-125228

(51) Int. Cl.
*G06F 16/2455*   (2019.01)
*G06F 16/23*     (2019.01)
(Continued)

(52) U.S. Cl.
CPC .......... *G06F 16/235* (2019.01); *G06F 16/248* (2019.01); *G06F 16/24564* (2019.01); *G06Q 10/0832* (2013.01)

(58) Field of Classification Search
None
See application file for complete search history.

(56) References Cited

U.S. PATENT DOCUMENTS 5,390,315 A   2/1995  Blandy et al.
6,182,089 B1  1/2001  Ganapathy et al.
(Continued)

FOREIGN PATENT DOCUMENTS

JP   2780385 B2    7/1998
JP   10-310258 A  11/1998
(Continued)

*Primary Examiner* — Wilson Lee
(74) *Attorney, Agent, or Firm* — Oblon, McClelland, Maier & Neustadt, L.L.P.

(57) ABSTRACT

According to an embodiment of the present invention, a probability to achieve a purpose is increased in a case where information is intermittently allocated to a plurality of elements. An information processing apparatus according to an embodiment of the present invention is an information processing apparatus that allocates information to respective elements included in a first set and includes an allocator. The allocator uses a first subset and a second subset, and allocates the information to at least one element included in the first subset. The first subset is constituted by elements which are included in the first set and in which information allocation may be performed at a present time. The second subset is constituted by elements which are included in the first set and in which the information allocation is not performed at the present time.

10 Claims, 17 Drawing Sheets

(51) Int. Cl.
*G06F 16/248* (2019.01)
*G06Q 10/08* (2012.01)

(56) References Cited

U.S. PATENT DOCUMENTS

| | | | | |
|---|---|---|---|---|
| 7,370,033 | B1* | 5/2008 | Roychowdhury | G06Q 30/02 |
| | | | | 707/602 |
| 7,822,939 | B1* | 10/2010 | Veprinsky | G06F 3/0641 |
| | | | | 711/170 |
| 9,965,201 | B1* | 5/2018 | Bono | G06F 3/0667 |
| 10,931,602 | B1* | 2/2021 | Matthews | H04L 49/35 |
| 2008/0140947 | A1* | 6/2008 | Slik | H04L 43/0876 |
| | | | | 711/154 |
| 2009/0091451 | A1* | 4/2009 | Jones | G06K 7/0008 |
| | | | | 340/572.1 |
| 2010/0172502 | A1* | 7/2010 | Jones | G08B 13/2462 |
| | | | | 380/277 |
| 2012/0102289 | A1 | 4/2012 | Maram et al. | |
| 2016/0224393 | A1* | 8/2016 | Arnady | G06F 16/2379 |
| 2017/0139832 | A1* | 5/2017 | Gupta | G06F 12/0855 |
| 2017/0171850 | A1* | 6/2017 | Ang | H04W 72/0406 |
| 2017/0344028 | A1* | 11/2017 | Westermo | H04L 67/12 |
| 2018/0120780 | A1* | 5/2018 | Billings | G05B 9/03 |
| 2018/0224807 | A1* | 8/2018 | Billings | G05B 15/02 |
| 2018/0234492 | A1* | 8/2018 | Moscibroda | H04L 67/1023 |
| 2018/0349291 | A1* | 12/2018 | Klingauf | G06F 12/0804 |
| 2019/0220804 | A1* | 7/2019 | Musunuri | B65G 1/10 |
| 2019/0266191 | A1* | 8/2019 | Li | G06F 16/00 |
| 2019/0332299 | A1* | 10/2019 | Armangau | G06F 3/064 |
| 2019/0354412 | A1* | 11/2019 | Bivens | G06F 9/5033 |
| 2019/0393986 | A1* | 12/2019 | Wang | H03M 13/6306 |
| 2020/0050971 | A1* | 2/2020 | Kim | G06N 3/063 |
| 2020/0068608 | A1* | 2/2020 | Ye | H04W 72/04 |
| 2020/0074371 | A1* | 3/2020 | Bogolea | G06Q 10/087 |
| 2020/0110639 | A1* | 4/2020 | Corsi | G06F 9/3004 |
| 2020/0310969 | A1* | 10/2020 | Schuttenberg | G06F 12/128 |
| 2020/0409862 | A1* | 12/2020 | Morgenstern | G06F 12/08 |

FOREIGN PATENT DOCUMENTS

| | | |
|---|---|---|
| JP | 2001-236340 A | 8/2001 |
| JP | 4680345 B2 | 5/2011 |

* cited by examiner

INFORMATION PROCESSING APPARATUS, INFORMATION PROCESSING METHOD, AND INFORMATION PROCESSING SYSTEM

CROSS-REFERENCE TO RELATED APPLICATION (S)

This application is based upon and claims the benefit of priority from Japanese Patent Application No. 2019-125228, filed Jul. 4, 2019; the entire contents of which are incorporated herein by reference.

FIELD

Embodiments described herein relate generally to an information processing apparatus, an information processing method, and an information processing system.

BACKGROUND

Increase in work efficiency, efficient use of resources, and the like have been progressed using an information processing technology. For example, in a case where a plurality of packages are packed into a box, it is possible to reduce the number of boxes to be used by performing processing for deciding packing positions of the respective packages so as to increase a packing fraction in the box. In this manner, to achieve a purpose, information considered as appropriate is generated and allocated to a plurality of objects.

However, in a case where the information is allocated to the plurality of objects, it is assumed that an order for allocating the information is optionally decided. For example, in the processing for deciding the packing positions of the packages, normally, the packages that are set as packing objects may be packed in any order. However, packing of a package in a box in a first-in, first-out manner is also commonly practiced as the package has arrived in transportation industries. A related-art technology does not cope with a scheme for deciding the packing position with respect to the package each time the package has arrived. In this manner, instead of the allocation of the information to all the elements at once, a scheme is demanded with which it is also possible to cope with a case where the information is intermittently allocated.

DETAILED DESCRIPTION

According to an embodiment of the present invention, a probability to achieve a purpose is increased in a case where information is intermittently allocated to a plurality of elements.

An information processing apparatus according to an embodiment of the present invention is an information processing apparatus that allocates information to respective elements included in a first set and includes an allocator. The allocator uses a first subset and a second subset, and allocates the information to at least one element included in the first subset. The first subset is constituted by elements which are included in the first set and in which information allocation may be performed at a present time. The second subset is constituted by elements which are included in the first set and in which the information allocation is not performed at the present time.

Below, a description is given of embodiments of the present invention with reference to the drawings. The present invention is not limited to the embodiments.

First Embodiment

Figure 1:
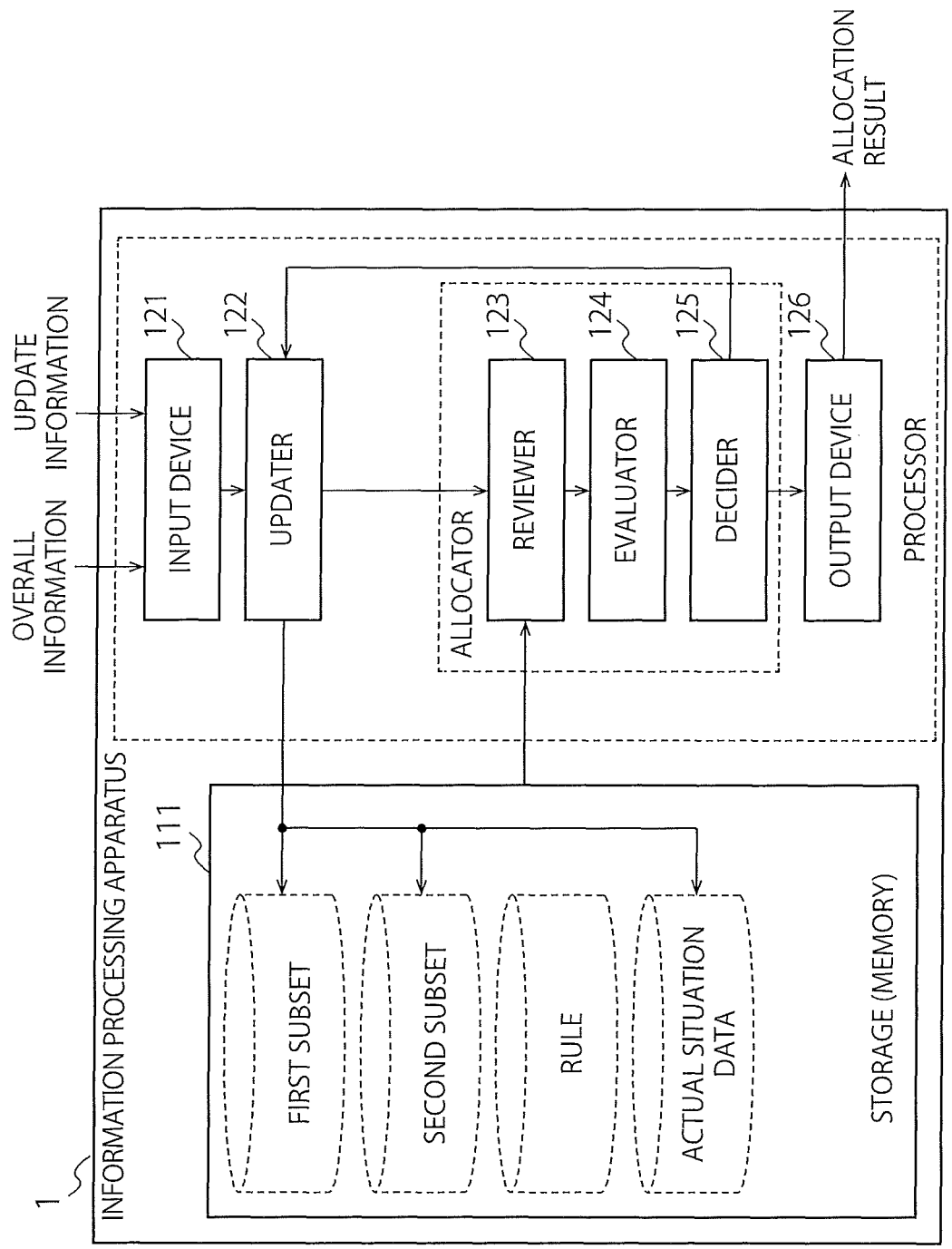
FIG. 1 is a block diagram illustrating an example of an information processing apparatus according to a first embodiment.

FIG. 1 is a block diagram illustrating an example of an information processing apparatus according to a first embodiment. An information processing apparatus 1 according to the first embodiment includes a storage 111, an input device 121, an updater 122, a reviewer 123, an evaluator 124, a decider 125, and an output device 126.

It is noted that respective components of the information processing apparatus illustrated in FIG. 1 may be segmented or consolidated. For example, the storage 111 may be segmented for each information to be stored. In addition, as illustrated in FIG. 1, the reviewer 123, the evaluator 124, and the decider 125 may be collectively regarded as an allocator, or the components except for the storage 111 may be regarded as a processor. It is noted that a memory may be used instead of the storage 111.

The information processing apparatus 1 is an apparatus that allocates information to a plurality of predetermined objects. For example, it is assumed that packing positions are allocated to a plurality of packages. As an alternative configuration, it is assumed that resources such as cache included in the computer are allocated to a plurality of processes in a computer. In this manner, the objects to which the information is allocated and the information to be allocated are diverse. However, the information processing apparatus 1 does not allocate the information to all the allocation objects at once. The information processing apparatus 1 intermittently recognizes the objects to which the information allocation may be performed, and then intermittently allocates the information to at least one of the objects to which the information allocation may be performed.

It is noted that herein, a set in which all objects to which the information is to be allocated are included is referred to as a "whole set (first set)". Since the objects to which the information is to be allocated are elements included in the whole set, the objects are also referred to as "elements".

Figure 2:
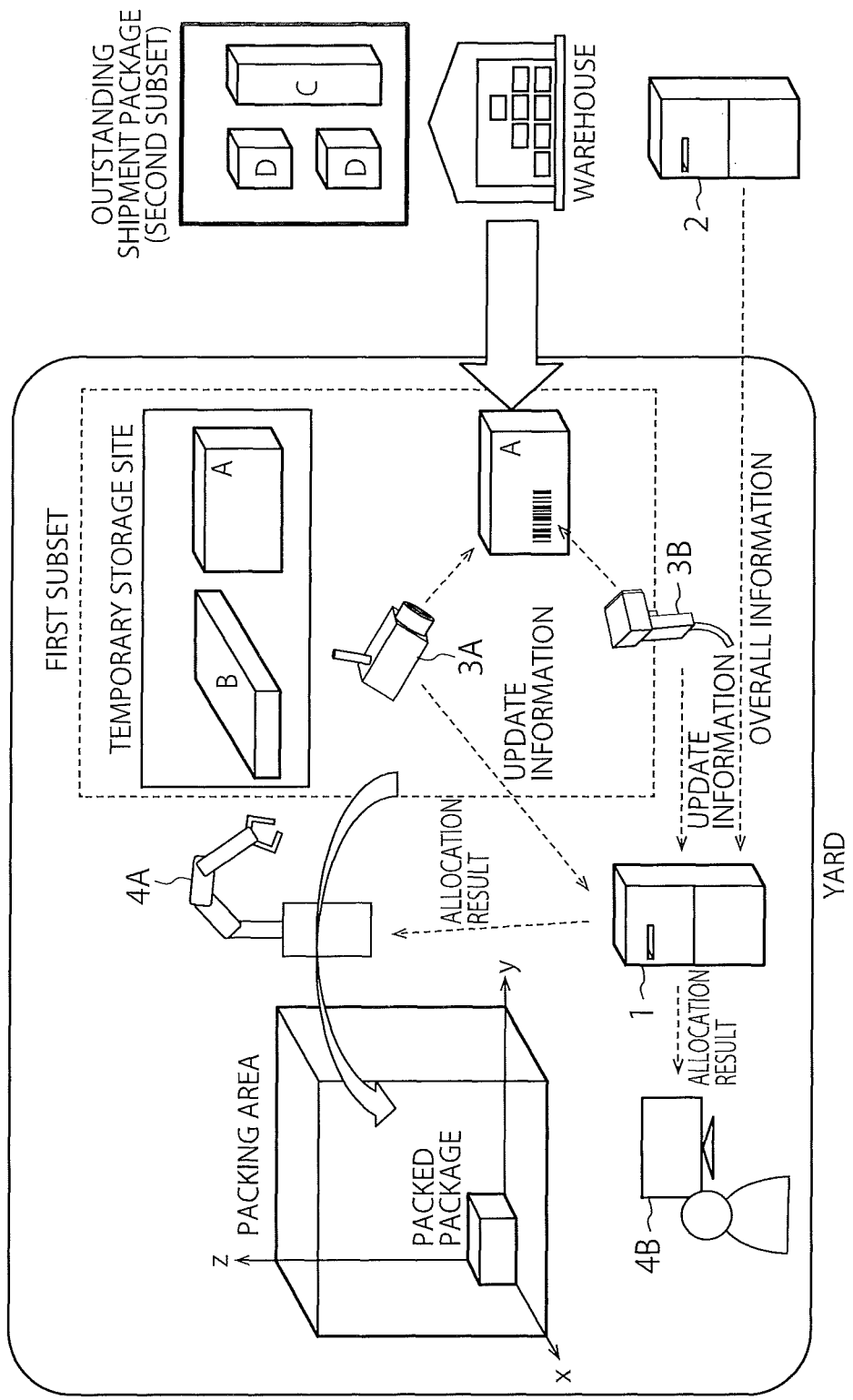
FIG. 2 is a conceptual diagram illustrating an example of use of the information processing apparatus according to the first embodiment.

The information processing apparatus 1 will be described with reference to a specific example. FIG. 2 is a conceptual diagram illustrating an example of use of the information processing apparatus 1 according to the first embodiment. FIG. 2 illustrates an example where a packing operation for packages is performed using the information processing apparatus 1. It is assumed that packages are sent from a warehouse to a yard, and the packages are packed into a specified area in the yard. In the example of FIG. 2, six packages in total including two packages of a type A, one package of a type B, one package of a type C, and two packages of a type D are set as packing objects.

It is noted that an area in which the packages are to be packed will be referred to as a "packing area" below. The packing area is not particularly limited, and may be, for example, a mere box, or may be another warehouse different from the warehouse in which the packages are initially stored. As an alternative configuration, a virtually segmented space in a warehouse, a site, or the like may be set as the packing area.

It is noted that a "temporary storage site" illustrated in FIG. means an area where packages that have arrived are temporarily pooled without being packed into the packing area. It is assumed that the yard has the above-mentioned temporary storage site, but the temporary storage site is not necessarily essential.

First, information related to all the packages set as the packing objects, that is, information related to the whole set is transmitted from a management server 2 or the like of the warehouse where the packages are stored to the information processing apparatus 1. Accordingly, the information processing apparatus 1 recognizes all the packages set as the packing objects. Hereinafter, the information related to the whole set will be referred to as "overall information".

Thereafter, the packages set as the packing objects arrive at the yard from the warehouse "intermittently", not "at once". For example, it is assumed that the packages are carried into the yard by a belt conveyor. FIG. 2 illustrates arrival of the package A at the yard. It is noted that a plurality of packages may arrive at the same time.

The package that has arrived is identified, and the information processing apparatus 1 acquires a result of the identification. For example, it is conceivable that a worker in the yard identifies the package and inputs the identification result to the information processing apparatus 1. As an alternative configuration, it is conceivable that a package identification device disposed in the yard identifies the package and transmits the identification result to the information processing apparatus 1. FIG. 2 illustrates a camera device 3A that identifies a package from an image of the package, and a barcode scanner 3B that identifies a package from a barcode affixed to the package as an example of the package identification device. The identification result is used for updating a first subset and a second subset which will be described below. For this reason, the identification result is also referred to as "update information".

The information processing apparatus 1 regards the package included in the update information as the element in which the information allocation may be performed and allocates information indicating the packing position to the package. This allocation result may be output to an apparatus such as a robot arm 4A that automatically packs the packages illustrated in FIG. 2, for example. As an alternative configuration, for example, the allocation result may be output to a display such as a monitor 4B illustrated in FIG. 2. When the allocation result is displayed, the worker can place the target package in the decided packing position. In this manner, each time a package has arrived, the acquisition of the update information, the information allocation, and the output of the allocation result are repeated, so that the packages are intermittently packed into the packing area.

It is noted that in a case where the above-described temporary storage site exists, the information processing apparatus 1 may suspend the information allocation to the package that has arrived. In a case where the information allocation is suspended, the package that has arrived is placed in the temporary storage site. It is noted that information related to the temporary storage site such as the number of packages that can be placed in the temporary storage site or a size of the temporary storage site is previously stored in the storage 111 of the information processing apparatus 1. It is determined whether or not the suspension can be performed on the basis of the information.

It is noted that the information does not necessarily need to be allocated to all the elements in which the information allocation may be performed at once. In other words, it is sufficient that the information processing apparatus 1 allocates the information to at least one element at onetime. For example, the packing positions do not necessarily need to be decided with respect to all of the plurality of packages placed in the temporary storage site at once.

Next, the components of the information processing apparatus 1 will be described mainly with reference to the example of FIG. 2.

The storage 111 stores information for performing the allocation. Specifically, a set constituted by the elements in which the information allocation may be performed at a present time is stored. Herein, the set is referred to as the first subset. In other words, the first subset indicates the elements set as the allocation objects at the present time. A set constituted by the element in which the information allocation is not performed at the present time is also stored. Herein, the set is referred to as the second subset. In other words, the second subset indicates the elements that are set as non-allocation objects at the present time.

A rule used when the allocation is performed is also stored. The rule may be a related-art rule. For example, a bottom-left-deep (BLD) method that is commonly called vertical stack may also be used in which packing is performed by priority in the stated order of bottom, left, and deep in the packing area, and a deep-bottom-left (DBL) method that is commonly called flat stack may also be used in which packing is performed by priority in the stated order of deep, bottom, and left in the packing area. The rule to be used may be appropriately determined in accordance with the allocation objects of the information, use contents of the allocation results, and the like, and stored in the storage 111.

Data indicating an actual situation (phase) of the information allocation is also stored. The data is referred to as "actual situation data". For example, the actual situation data indicates a situation in the packing area, and it is possible to read an area that can be allocated in the packing area from the actual situation data. In other words, already allocated information and information that can be allocated from this time point are recognized on the basis of the actual situation data. It is noted that the already allocated information may turn to the information that can be allocated from this time point again. For example, in a case where the package A and the package B are packed into the warehouse but the package A is removed from the warehouse, the actual situation data indicates the packing position of only the package B.

It is noted that the storage 111 may also store information other than the above-described information. For example, processing results and the like of the respective components of the information processing apparatus 1 may be sequentially stored in the storage 111.

The input device 121 acquires these information from information provision apparatuses that provide the overall information and the update information such as the management server 2 and the camera device 3A illustrated in the example of FIG. 2.

The updater 122 updates the first subset and the second subset stored in the storage 111 on the basis of the information from the input device 121. For example, the packages have not yet arrived, but the overall information indicating the above-described six packages set as the packing objects is acquired. In the above-mentioned case, all the packages are set as the non-allocation objects at the present time, the second subset stores {A, A, B, C, D, D}. On the other hand, the first subset remains the empty state. Thereafter, in a case where the update information regarding arrival of the package A is acquired, the updater 122 takes out one element A from the second subset to be transferred to the first subset. Accordingly, the first subset stores {A}, and the second subset stores {A, B, C, D, D}.

After the information is allocated to the element included in the first subset, the updater 122 deletes the element from the first subset. This means the update to a state after the element is packed into the packing area. For example, in a case where the first subset stores {A} and the second subset stores {A, B, C, D, D}, when the information is allocated to the element A, the first subset becomes empty, and the second subset remains {A, B, C, D, D}. When information indicating that the package to which the packing position is allocated is actually packed is acquired via the input device 121 or the like, a process for deleting the element to which the information is allocated from the first subset may be performed, for example. As an alternative configuration, the update may be automatically performed due to an elapse of time.

It is noted that the package may be distinguished by an individual identification number or the like uniquely assigned to the package instead of a type of the package. Hereinafter, for convenience of the explanation, packages even having the same type are distinguished for descriptions using suffixes like $A_1$ and $A_2$, and $D_1$ and $D_2$. Herein, for convenience of the explanation, descriptions will be provided while the packages are packed first in ascending order of the suffix numbers irrespective of any rules.

The reviewer 123 reviews the information to be allocated to the respective elements using the rule stored in the storage 111, and calculates review results, that is, candidates of the information to be allocated. First, the reviewer 123 reviews the information to be allocated to the respective elements included in the first subset and calculates the review results. The review is referred to as a first calculation. In a case where a plurality of rules are used, the first calculation is performed for each of the rules. The reviewer 123 reviews the information to be allocated to the respective elements included in the second subset on the basis of the results of the first calculation, and calculates the review results. The review is referred to as a second calculation.

The processing by the reviewer 123 under the situation illustrated in FIG. 2 will be described. The situation corresponds to a situation where i) one piece of the package A and one piece of the package B are placed in the temporary storage site, ii) the package A is carried into the yard, and iii) one piece of the package C and two pieces of the packages D have not yet arrived. Under the above-described situation, the first subset is indicated by {$A_1$, $A_2$, B}, and the second subset is indicated by {C, $D_1$, $D_2$}.

Herein, the review is performed using two types of rules including a first packing rule and a second packing rule. According to both the first and second packing rules, the packages are preferentially placed in the temporary storage site in a case where the temporary storage site is available. Under the present situation, since the temporary storage site is not available, the information allocation is not suspended, and the information is allocated to at least any one of the package $A_1$, the package $A_2$, and the package B included in the first subset.

Then, according to the first packing rule, the package having the large bottom area is preferentially placed first. It is noted that herein, the bottom area is larger in the stated order of the package B, the package A, the package C, and the package D. The package is preferentially placed on the left in the packing area as much as possible, and then placed on the bottom as much as possible. In the plan view, the package is installed such that a longitudinal direction of the package becomes parallel to a Y axis or an X axis illustrated in the packing area in FIG. 2, and the package is preferentially installed in parallel with the Y axis. In other words, in a case where the installation is not performed by setting the longitudinal direction to be in parallel with the Y axis, the package is rotated and installed to be in parallel with the X axis.

According to the second packing rule, the package having the small bottom area is preferentially placed first. The package is preferentially placed on the right in the packing area as much as possible, and then placed on the near side as much as possible. Similarly as in the first packing rule, the package is installed such that the longitudinal direction of the package becomes parallel to the Y axis or the X axis in FIG. 2, and the package is preferentially installed in parallel with the Y axis.

Figure 3A:
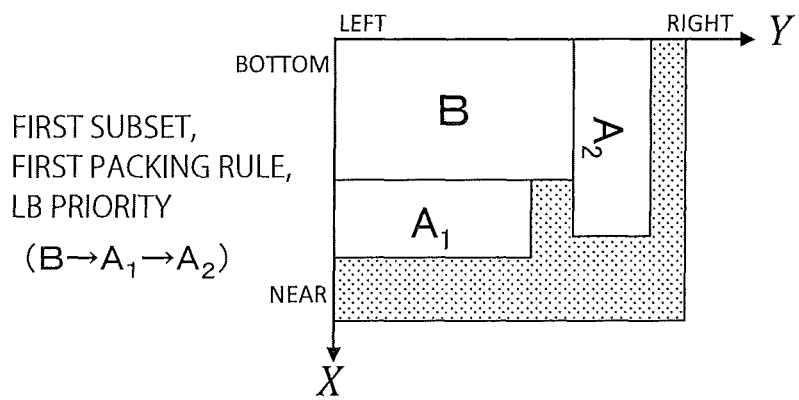
FIGS. 3A and 3B are plan views illustrating an example of a result of a first calculation.
Figure 3B:
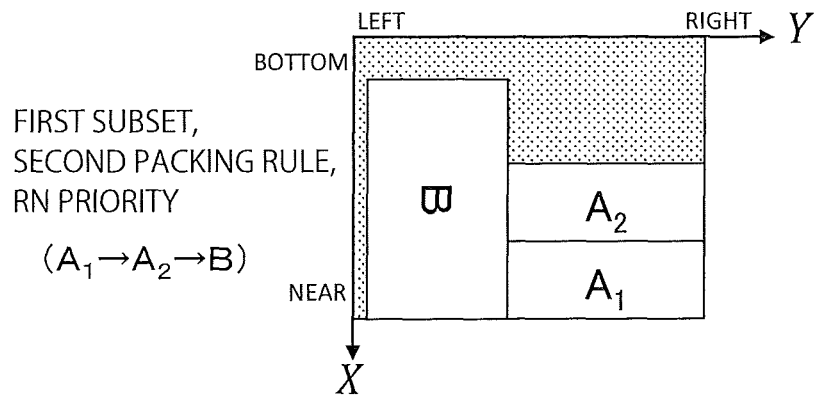

The reviewer 123 first performs the first calculation. Herein, the positions of the package $A_1$, the package $A_2$, and the package B included in the first subset are derived for each of the rules. FIGS. 3A and 3B are plan views illustrating an example of a result of the first calculation. It is noted that an area having a dot pattern means a free space in the packing area. FIG. 3A illustrates the result of the first calculation in a case where the first packing rule is used. In other words, FIG. 3A illustrates the result when, in the stated order of the package B, the package $A_1$, and the package $A_2$, those packages are installed on the left (LEFT) in the packing area as much as possible, and then installed on the bottom (BOTTOM) as much as possible. On the other hand, FIG. 3B illustrates the result of the first calculation in a case where the second packing rule is used. In other words, FIG.

3B illustrates the result when, in the stated order of the package $A_1$, the package $A_2$, and the package B, those packages are installed on the right (RIGHT) in the packing area as much as possible, and then installed on the near (NEAR) as much as possible.

After the first calculation, the reviewer 123 performs the second calculation. Herein, the second calculation based on the first packing rule is performed with respect to the result of the first calculation based on the first packing rule, and the second calculation based on the second packing rule is performed with respect to the result of the first calculation based on the second packing rule. It is noted that the second calculation based on each of the packing rules may be performed with respect to the respective review results generated in the first calculation. In other words, the second calculation based on the second packing rule may be performed with respect to the result of the first calculation based on the first packing rule, and the second calculation based on the first packing rule may be performed with respect to the result of the first calculation based on the second packing rule. In the above-mentioned case, four second calculation results are generated in total.

Figure 4A:
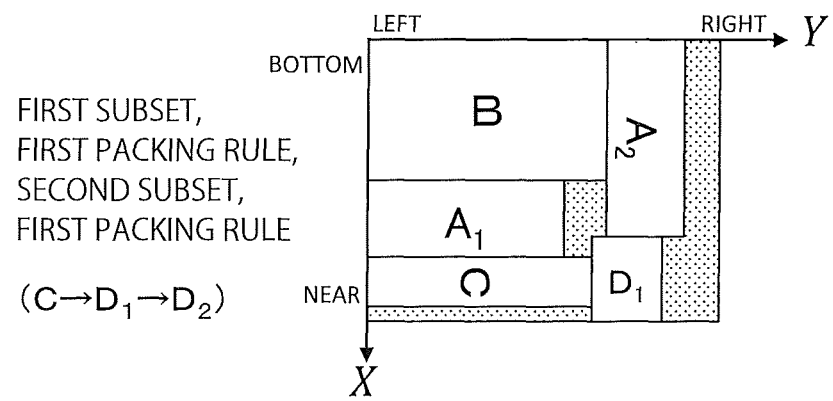
FIGS. 4A and 4B are plan views illustrating an example of a result of a second calculation.
Figure 4B:
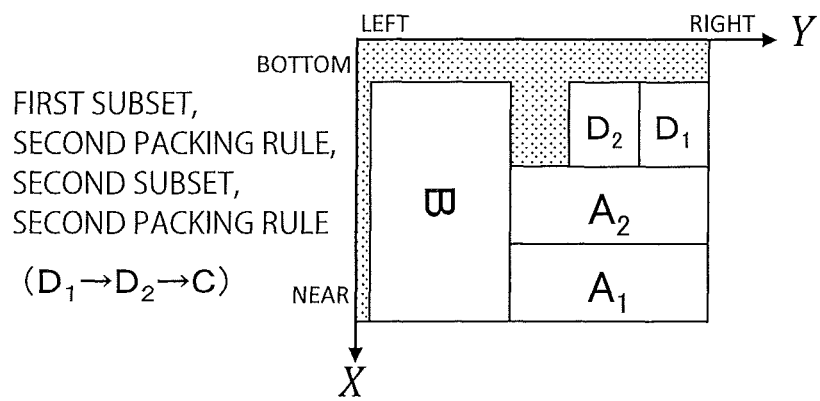

FIGS. 4A and 4B are plan views illustrating an example of a result of the second calculation. FIG. 4A illustrates the result of the review using the first packing rule in both the first calculation and the second calculation. In other words, with respect to the result of FIG. 3A, FIG. 4A illustrates the result in which in the stated order of the package C, the package $D_1$, and the package $D_2$, those packages are attempted to be installed on the left in the packing area as much as possible, and then installed on the bottom as much as possible. However, in FIG. 4A, the package $D_2$ is not installed since the space runs out after the installment of the package $D_1$.

FIG. 4B illustrates the result of the review using the second packing rule in both the first calculation and the second calculation. In other words, with respect to the result of FIG. 3B, FIG. 4B illustrates the result in which in the stated order of the package $D_1$, the package $D_2$, and the package C, those packages are attempted to be installed on the right in the packing area as much as possible, and then installed on the near side as much as possible. However, the package C is not installed since the space runs out after the installment of the package $D_2$.

The evaluator 124 evaluates each of the review results by the reviewer 123. For example, it is conceivable to calculate a score with respect to each of the review results on the basis of a predetermined calculation expression. For example, it is conceivable to use the number of packages that have been successfully packed, a packing fraction, and the like as variables in the calculation expression. In addition to the above, the number of gaps in the box and positions, a contact rate between the packages, and the like may also be used as the variables. It is noted that the gap may be a gap related to any one of a vertical direction and a horizontal direction. For example, the gap may also be a gap between a highest point of the stacked-up package and a ceiling plane. In this manner, the variables may be appropriately set in accordance with the allocation objects of the information, use contents of the allocation results, and the like.

The decider 125 decides the information to be allocated to at least one element included in the first subset on the basis of the evaluations by the evaluator 124. For example, the review result having the highest score among all the review results is regarded as the most satisfactory, and the packing position based on the most satisfactory review result is confirmed.

For example, with respect to the review result in FIG. 4A and the review result in FIG. 4B, the review result in FIG. 4A in which the occupied rate of a bottom surface is larger is more highly evaluated. In the above-mentioned case, the decider 125 confirms the packing position of at least any one of the package $A_1$, the package $A_2$, and the package B as the position illustrated in FIG. 4A. The packing position of which package may be decided on the basis of a predetermined condition. For example, only the packing position of the package that is packed first in the first calculation may be confirmed. As an alternative configuration, among the three packages, the packing position of only the package having the smallest or largest volume may be confirmed. It is noted that all the packing positions of the package $A_1$, the package $A_2$, and the package B may be confirmed. It is noted that as the number of packages where the position is confirmed in the single review is lower, the number of positions where the remaining packages can be installed is increased, and a risk of decrease in the packing fraction can be suppressed, which is preferable. Herein, only the packing position of the package B that is packed first is confirmed.

It is noted that the number of the elements to which the information is to be allocated may be changed. For example, initially, at one time, the information is allocated to one element in the first subset, but the information may be allocated to all the elements in the first subset at a time point when no element exists in the second subset.

It is noted that the information to be allocated may be decided on the basis of the result of the first calculation without performing the second calculation. For example, in the first calculation based on the first packing rule, all the packages included in the first subset can be installed, but in the first calculation based on the second packing rule, in a case where all the packages included in the first subset are not installed, the packing position may be confirmed from the result of the first calculation where all the packages can be installed.

The decider 125 transmits the decided packing position to the updater 122. Accordingly, the actual situation data, the first subset, and the second subset stored in the storage 111 are updated via the updater 122.

After the packing position of the package B is confirmed, the package $D_1$ has arrived at the yard. The updater 122 adds the package $D_1$ to the first subset, the reviewer 123 performs the first calculation and the second calculation similarly as before. In this manner, each time the package set as the allocation object arrives, in other words, each time the element is added to the first subset, the information allocation is executed with respect to the element included in the first subset. In this manner, the information is intermittently allocated to each of the elements included in the first set.

Figure 5A:
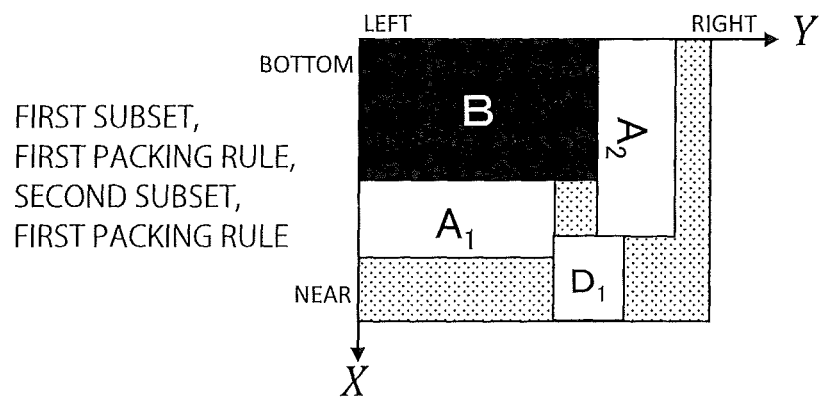
FIGS. 5A and 5B are plan views illustrating an example of a result of the second calculation after information is allocated.
Figure 5B:
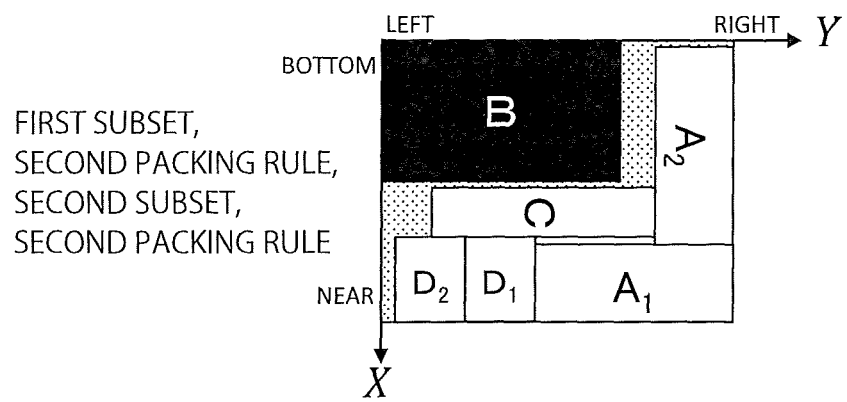

FIGS. 5A and 5B are plan views illustrating an example of a result of the second calculation after the information is allocated. Similarly as described above, FIG. 5A illustrates the result of the review using the first packing rule in both the first calculation and the second calculation. FIG. 5B illustrates the result of the review using the second packing rule in both the first calculation and the second calculation. In FIGS. 5A and 5B, the package B where the packing position is confirmed in the previous review is filled in black.

Since only the packing position of the package B is confirmed and the package $D_1$ has newly arrived, the first subset is updated to $\{A_1, A_2, D_1\}$. The second subset is updated to $\{C, D_2\}$. Therefore, the positions with respect to the package $A_1$, the package $A_2$, and the package $D_1$ are derived in the first calculation, and the positions with respect to the package C and the package $D_2$ are derived in the second calculation. As illustrated in FIG. 5A, when the first packing rule is used, after the installment of the package $D_1$, the space for the package $D_2$ and the package C is not available. On the other hand, as illustrated in FIG. 5B, when the second packing rule is used, all the packages can be installed. Accordingly, in this occasion, the review result based on the second packing rule is highly evaluated, and the packing position of at least any one of the package $A_1$, the package $A_2$, and the package $D_1$ is confirmed as the position indicated by the second packing rule.

In this manner, the information is allocated to at least one element included in the first subset by the reviewer 123, the evaluator 124, and the decider 125 using the first subset and the second subset.

The output device 126 outputs the decided information to an output destination for output. Accordingly, the package is actually packed into the packing area on the basis of the output information.

Figure 6A:
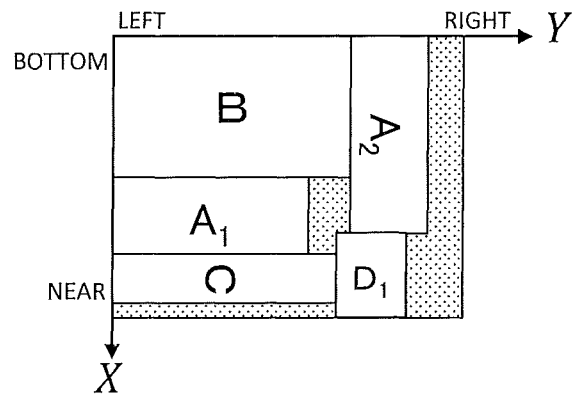
FIGS. 6A to 6C are plan views illustrating an example of a final allocation result.
Figure 6B:
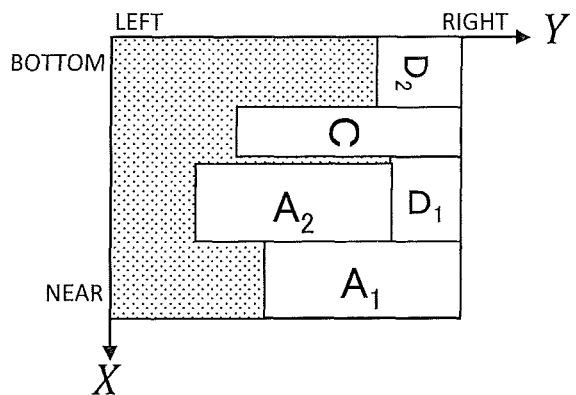
Figure 6C:
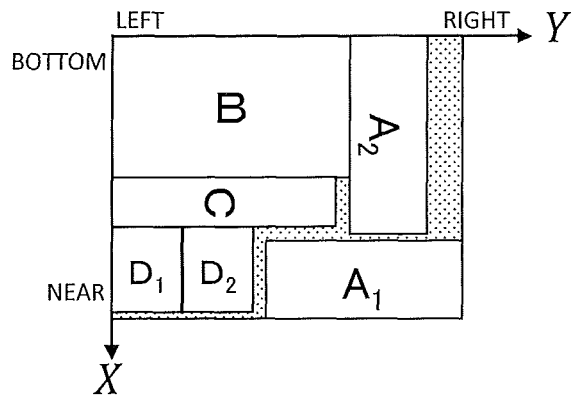

FIGS. 6A to 6C are plan views illustrating an example of a final allocation result. FIG. 6A illustrates the allocation result in a case where only the first packing rule is used. FIG. 6B illustrates the allocation result in a case where only the second packing rule is used. FIG. 6C illustrates the allocation result in a case where both the first packing rule and the second packing rule are used as described above. Herein, after the package $D_1$, the package C has arrived next. In addition, only the packing position of the package that is placed first in the first calculation is confirmed.

In a case where only the first packing rule is used, first, the package B is installed from among the package $A_1$, the package $A_2$, and the package B. Next, the package $A_1$ is installed from among the package $A_1$, the package $A_2$, and the package $D_1$. Next, the package $A_2$ is installed from among the package $A_2$, the package $D_1$, and the package C. Next, the package C is installed from among the package $D_1$, the package C, and the package $D_2$. Then, the package $D_1$ is installed out of the package $D_1$ and the package $D_2$. Thereafter, since no space is available, the package $D_2$ is not installed, and the situation illustrated in FIG. 6A is established.

In a case where only the second packing rule is used, first, the package $A_1$ is installed from among the package $A_1$, the package $A_2$, and the package B. Next, the package $D_1$ is installed from among the package $A_2$, the package B, and the package $D_1$. Next, the package C is installed from among the package $A_2$, the package B, and the package C. Next, the package $D_2$ is installed from among the package $A_2$, the package B, and the package $D_2$. Then, the package $A_2$ is installed out of the package $A_2$ and the package B. Thereafter, since no space is available, the package B is not installed, and the situation illustrated in FIG. 6B is established.

In a case where both the first packing rule and the second packing rule are used, as described above, first, the package B is installed, and the package $A_1$ is installed next. Thereafter, in the case of this occasion, the result based on the first packing rule in each of the reviews is more highly evaluated than the result based on the second packing rule. The packages are installed to the bottom left as much as possible to follow the stated order of the package $A_2$, the package C, the package $D_1$, and the package $D_2$, and the situation illustrated in FIG. 6C is established. The packing fraction in the packing area may be improved in a case where the plurality of rules are used in the above-mentioned manner as compared with a case where a single rule is used.

Figure 7:
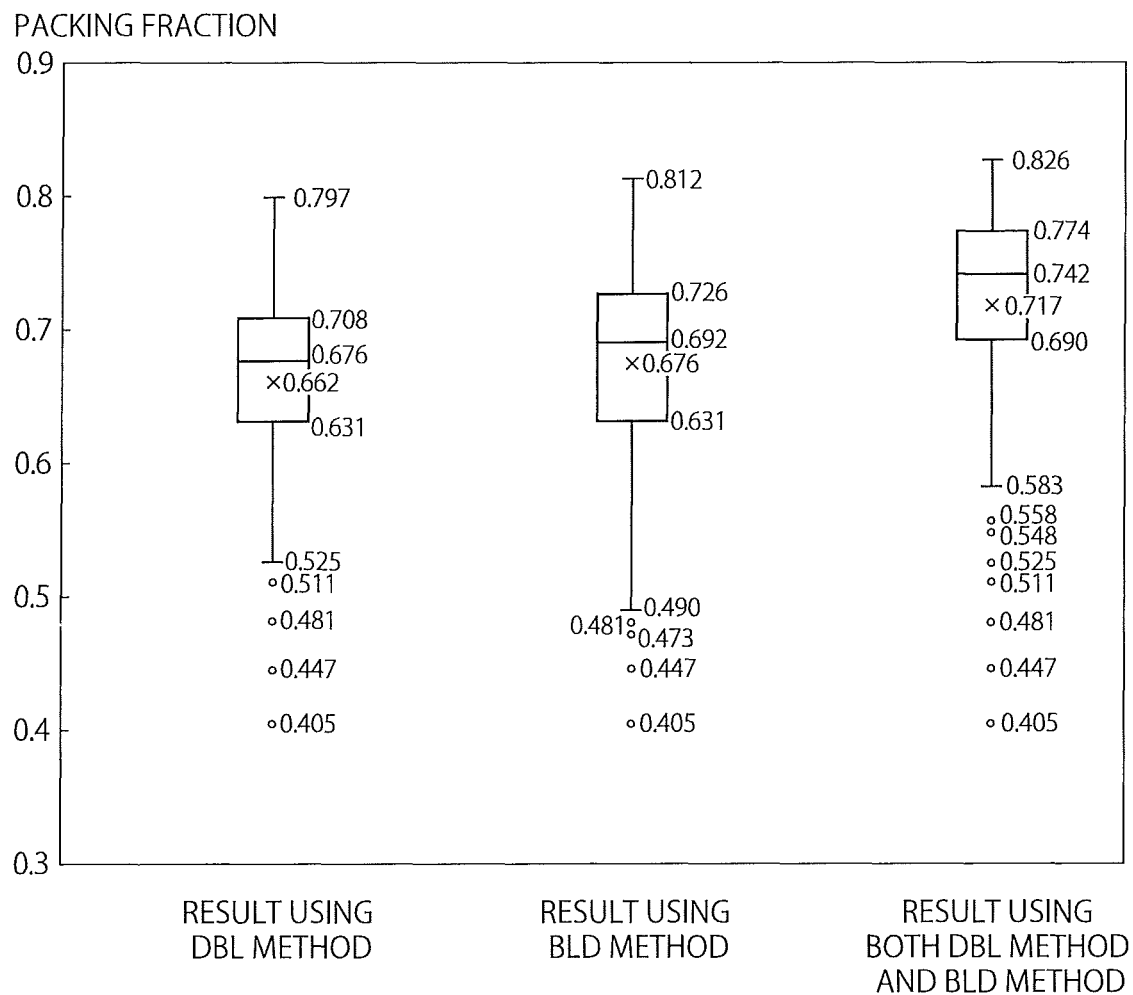
FIG. 7 is a box plot for describing an advantage in a case where a plurality of rules are used.

FIG. 7 is a box plot for describing an advantage in a case where a plurality of rules are used. Herein, 50 packages having different sizes are prepared, and 100 test patterns are created by changing the arrival order of these packages to perform a test. A size of an installment area is the same in all the test patterns. In addition, in all the test patterns, two packages can be placed in the temporary storage site, and the packing position of the single package is confirmed per review. FIG. 7 illustrates a distribution of the packing fraction in these test patterns. The result acquired by using only the DBL method is illustrated on the left side, and the result acquired by using only the BLD method is illustrated on the center. The result acquired by using both the DBL method and the BLD method is illustrated on the right side.

As may be understood from FIG. 7, in the result acquired by using both the DBL method and the BLD method, a minimum value, a first quadrant, a median, a third quadrant, and a maximum value are all higher than the other results. Therefore, the probability for achieving the purpose such as improvement in the packing fraction can be improved when the plurality of rules are used.

Figure 8A:
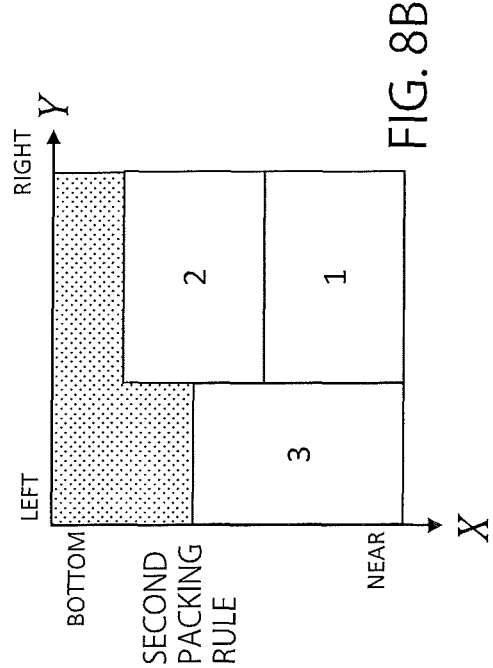
FIGS. 8A to 8C are plan views for describing another example of information allocation.
Figure 8B:
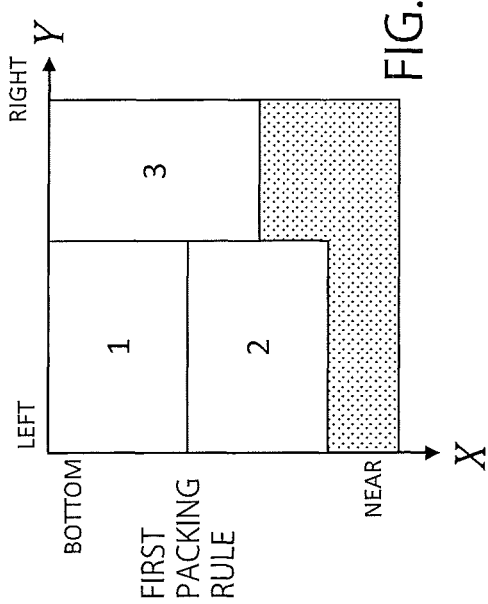
Figure 8C:
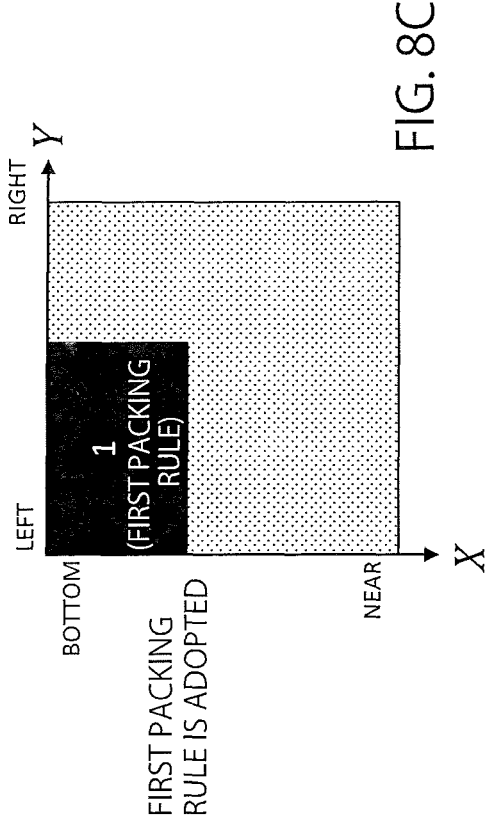

It is noted that even in a case where the temporary storage site does not exist or a case where the size of the packages are the same, when the allocation is performed as described above, a desired advantage such as the improvement in the packing fraction can be attained. FIGS. 8A to 8C are plan views for describing another example of the information allocation. Herein, an example will be described in which four packages having the same size are packed one by one. FIG. 8A illustrates the result of the review using the first packing rule described above. FIG. 8B illustrates the result of the review using the second packing rule described above. Three packages can be packed according to both the packing rules, but herein, the first packing rule is prioritized in a case where the numbers of packages that can be packed are the same. Therefore, as illustrated in FIG. 8C, the first package is packed on the bottom left indicated by the first packing rule.

Figure 9A:
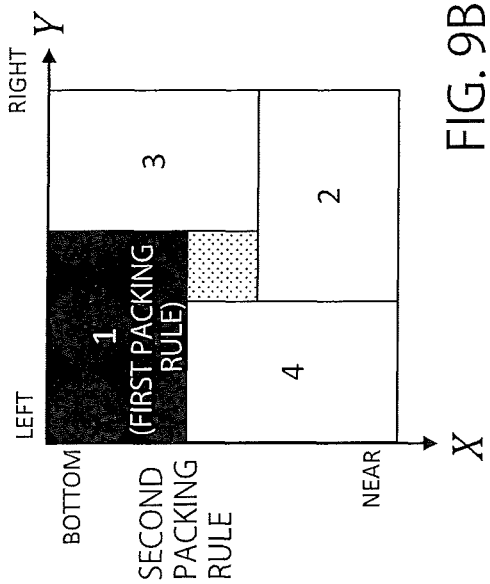
FIGS. 9A to 9D are plan views for describing a review after a packing position of a first package is confirmed in the example of FIGS. 8A to 8C.
Figure 9C:
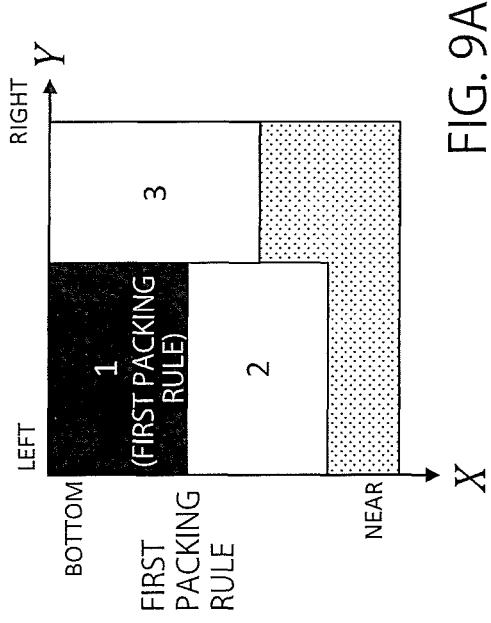
Figure 9B:
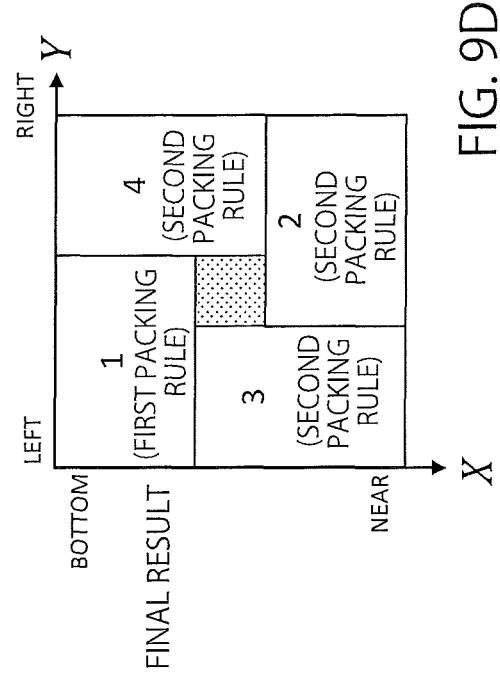

FIGS. 9A to 9C are plan views for describing a review after the packing position of the first package is confirmed in the example of FIGS. 8A to 8C. FIG. 9A illustrates the result of the review using the first packing rule after the packing position of the first package is confirmed. FIG. 9B illustrates the result of the review using the second packing rule after the packing position of the first package is confirmed. When the second packing rule is used, four packages can be packed which is more than a case where the first packing rule is used. Therefore, as illustrated in FIG. 9C, the second package is packed on the near right indicated by the second packing rule.

Figure 9D:
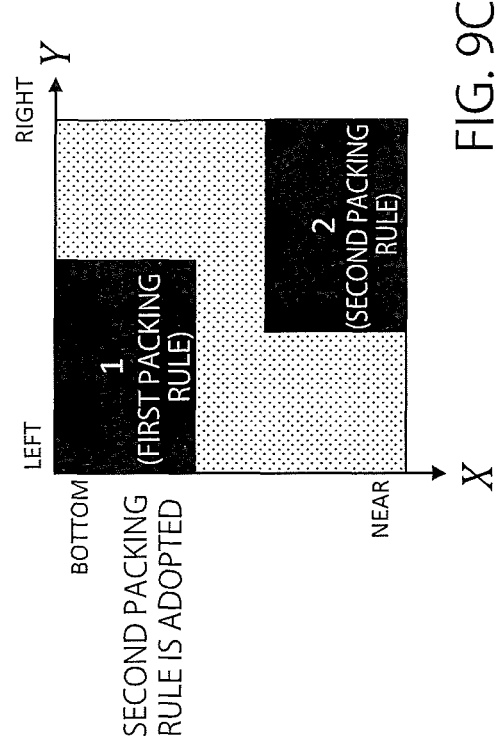

In the review after this, since the same number of packages can be packed according to both the first packing rule and the second packing rule, the first packing rule is prioritized, and the third package is packed on the near left, and the fourth package is packed on the bottom right to eventually establish a state illustrated in FIG. 9D. When the first packing rule or the second packing rule is used alone, the result becomes the same as the result illustrated in FIG. 8A or FIG. 8B, and only the three packages are packed, but when the review is performed using both the first packing rule and the second packing rule, the four packages can be packed.

As described above, the object to which the information is to be allocated and the information to be allocated are diverse. In other words, the element to which the information is allocated is not necessarily a package. In view of the above, another example of the use of the information processing apparatus 1 will be described. Herein, it is assumed that a computer device such as a hard disk recorder that performs streaming processing allocates sequentially generated processes used for the streaming processing to cache. The computer device corresponds to the "information processing apparatus 1". The process corresponds to the "element". The cache corresponds to the "packing area" in the example of FIG. 2. A position of the cache secured for the process corresponds to the "information to be allocated".

The information processing apparatus 1 attempts to allocate each of the process to the cache. The process that is not allocated to the cache is allocated to a memory. In the above-mentioned case, a processing speed is slowed as compared with a case where the process is allocated to the cache. Therefore, to speed up the processing, it is requested that as many processes as possible are allocated to the cache.

Figure 10:
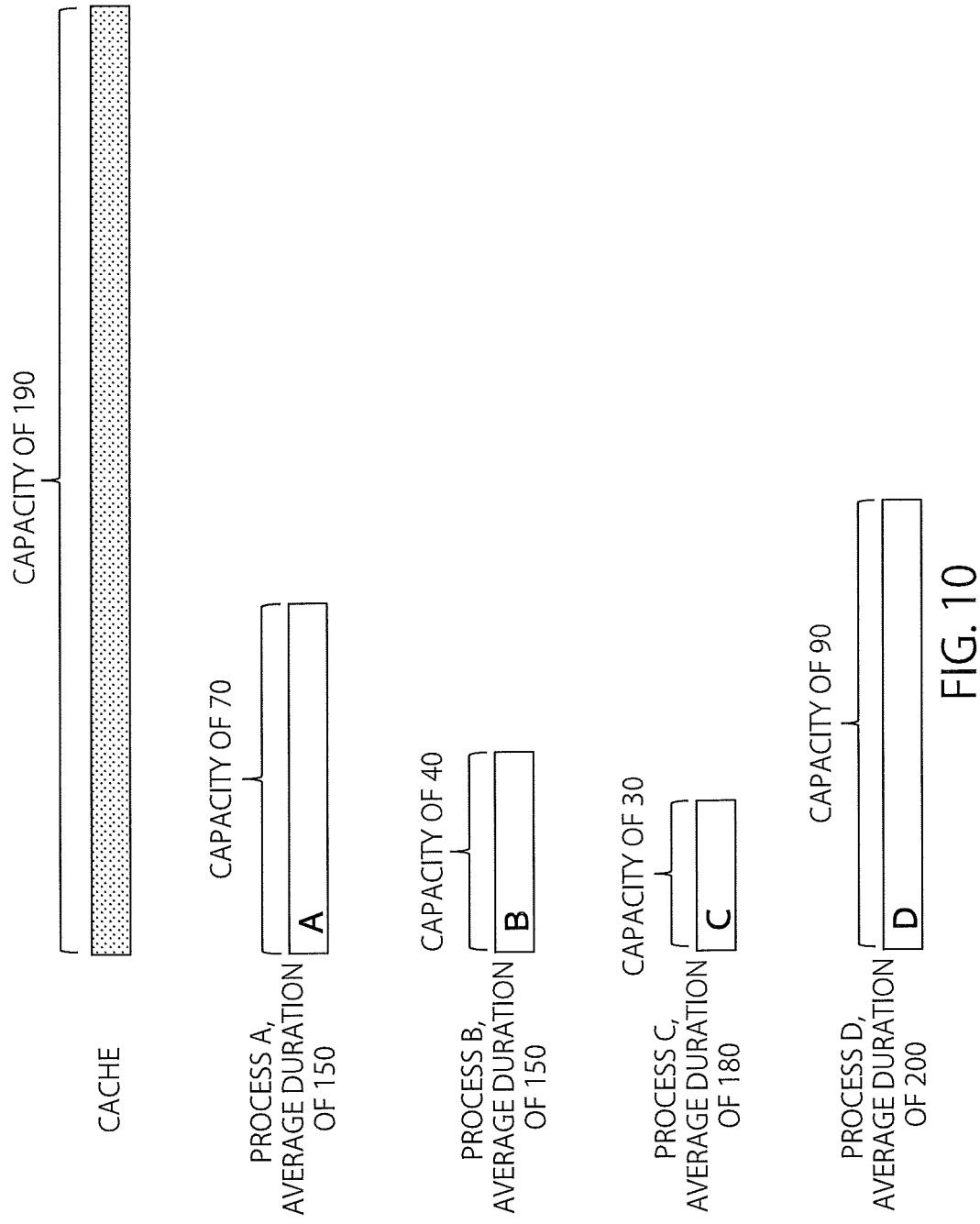
FIG. 10 is a drawing describing an assumed process and cache.

FIG. 10 is a drawing for describing the assumed process and the cache. In the above-described streaming processing, it is assumed that four processes including a process A to a process D are generated. FIG. 10 illustrates a capacity used for the cache and an average duration for each of the processes. A bar chart indicating the process is illustrated to be longer as the used capacity is larger. The average duration is an average of time period since the process is allocated to the cache until the cache is released. These information are acquired as the overall information. It is noted that the actual duration fluctuates with respect to the average duration. The average duration is used when the information allocation is reviewed. A detail will be described below.

FIG. 10 also illustrates the bar chart indicating the cache, and a length of the bar indicates a size of the capacity. The capacity of the cache is larger than each of the processes but is assumed to be 190 which is smaller than 200 corresponding to a total of all the processes. Therefore, all the processes are not allocated to the cache at the same time.

Herein, it is assumed that the cache is allocated as follows. A time "t"=0, the process A having the capacity of 70 is generated and allocated to the cache. At the time "t"=10, the process B having the capacity of 40 is generated and allocated to the cache. At the time "t"=20, the process A disappears earlier than the average duration, and the cache to which the process A is allocated is released. At the time "t"=30, the process A is generated again and allocated to the cache. At the time "t"=40, the process C having the capacity of 30 is generated and allocated to the cache. At the time "t"=160, the process B disappears in line with the average duration, and the cache to which the process B is allocated is released. At the time "t"=170, the process D is generated.

The information related to the above-mentioned generation and disappearance of the process corresponds to the update information. In a case where the information related to the process generation is acquired by the input device 121, the updater 122 deletes the process from the second subset to be added to the first subset. In this manner, each time the element is added to the first subset, the information allocation to the process included in the first subset is executed. In a case where the information allocation to the process is executed, the updater 122 updates the actual situation data, and the allocated area of the process is included in the actual situation data. In a case where the information related to the process disappearance is acquired by the input device 121, the updater 122 updates the actual situation data and the second subset. That is, the area of the process in the actual situation data is changed to a free area, and the process is added to the second subset.

Figure 11A:
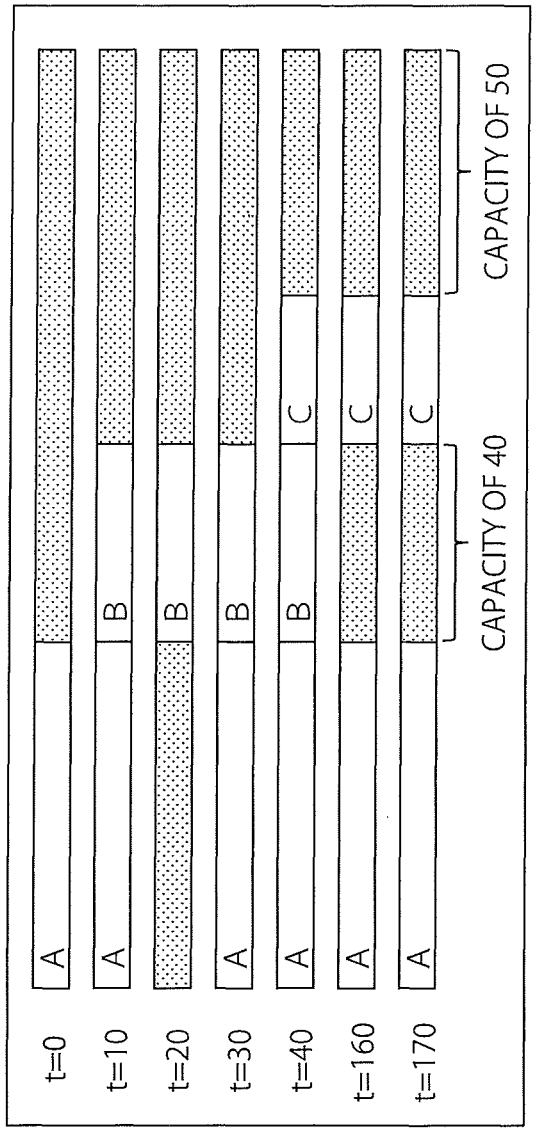
FIGS. 11A and 11B are drawings describing cache allocation based on a related-art method.
Figure 11B:
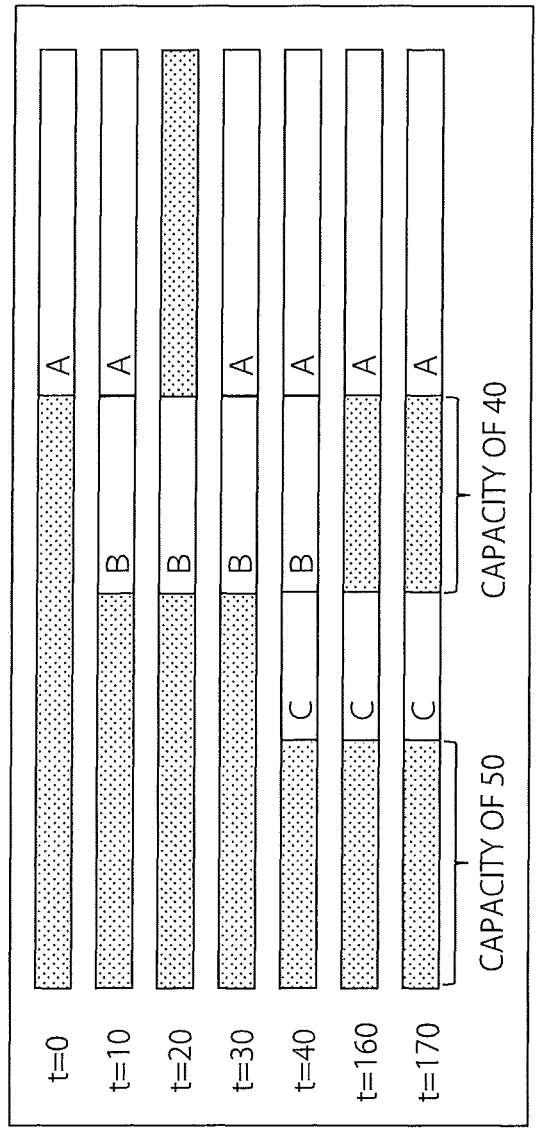

FIGS. 11A and 11B are drawings for describing allocation of the cache according to a related-art method. FIG. 11A is a drawing illustrating an example in a case where the generated cache is allocated to be left-aligned. A rule for allocating this generated process to be left-aligned to the cache will be referred to as a first cache rule. FIG. 11B is a drawing illustrating an example in a case where the generated cache is allocated to be right-aligned. A rule for allocating this generated process to be right-aligned to the cache will be referred to as a second cache rule. The bar chart illustrating the process on the bar chart illustrating the cache indicates an area in the cache to which the process is allocated. The area is referred to as an "allocation area". An area in the cache to which the process is not allocated is referred to as a "free area".

Even in a case where the respective processes are allocated to be adjacent to each other in the cache, when the cache disappears thereafter, the free area may be separated into plural areas in some cases. For example, the process A, the process B, and the process C are allocated to the cache without gaps at the time "t"=40. However, since the process B that exists between the process A and the process C disappears at the time "t"=160, two free areas having a capacity smaller than 90 exist at the time "t"=170. Therefore, at the time "t"=170, although the free capacity of 90 in total exists as a whole of the cache, since the free areas are separated, the process D that uses the capacity of 90 is not allocated to the cache. To avoid the above-described situation, the information processing apparatus 1 promotes the efficiency in the cache allocation.

The processing by the information processing apparatus 1 will be described with reference to a scene at the time "t"=10. When the process B is generated at the time "t"=10, the process B is transferred from the second subset to the first subset by the updater 122. Accordingly, the first subset includes the process B, and the second subset includes the process C and the process D.

The reviewer 123 performs the review using both the first cache rule and the second cache rule. First, the first calculation is performed with respect to a process included in a first partial area. In a case at the time "t"=10, the arrangement of the process B is reviewed. In the first calculation result based on the first cache rule, the process B is arranged on the immediate right of the process A, and in the first calculation result based on the second cache rule, the process B is arranged in the right end of the cache.

Figure 12A:
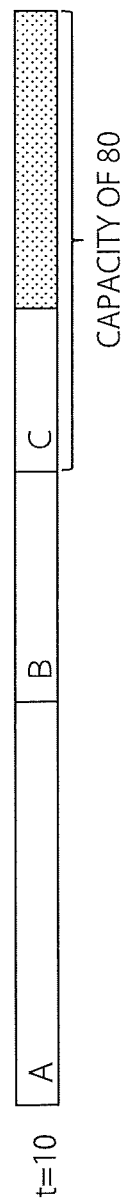
FIGS. 12A and 12B are drawings illustrating an example of a second calculation result in an actual situation.
Figure 12B:
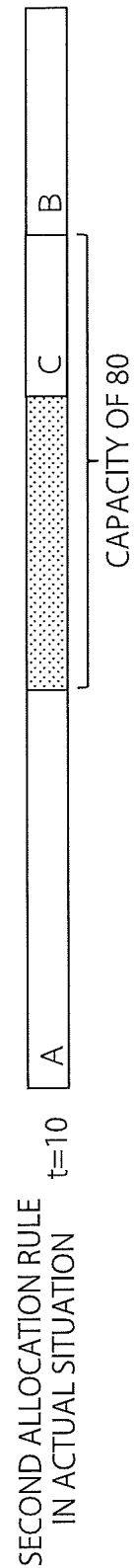

The reviewer 123 performs the second calculation on a process included in a second partial area with respect to the result of the first calculation. Herein, according to both the first cache rule and the second cache rule, a process having a larger capacity is preferentially allocated. FIGS. 12A and 12B are drawings illustrating an example of the second calculation result in the actual situation. It is noted that the second calculation in the actual situation where the process A and the process B exist is referred to as a second calculation in the actual situation to be distinguished from a second calculation in a virtual situation which will be described below. FIG. 12A illustrates the review result based on the first cache rule. FIG. 12B illustrates the review result based on the second cache rule. According to both the results in the first calculation, since a single free area having the capacity of 80 is created, the process D having the capacity of 90 is not arranged, and the process C only having the capacity of 30 is arranged.

Herein, the evaluator 124 performs the evaluation by setting a total capacity of each of the processes allocated to the cache among the processes included in the second partial area as a score with respect to the second calculation result in the actual situation. As illustrated in FIG. 12A and FIG.

12B, since only the process C is arranged according to both the review results, the scores are the same.

In this manner, in a case where each of the second calculation results in the actual situation has the same evaluation, the second calculation is performed again in the virtual situation. Specifically, in the virtual situation where one of the currently existing processes disappears, the processes included in the second partial area are allocated. The process supposed to disappear is decided on the basis of a survival time of the process and the average duration. The survival time means a time period that has elapsed since the process is generated. For example, at the time "t"=10, the process A and the process B exist. The remaining duration of the process A is calculated as 140 obtained by subtracting the survival time of 10 from the average duration of 150. On the other hand, since the remaining duration of the process B has been just generated, the remaining duration is 150 that is the same as the average duration. Therefore, since a probability that the process A disappears early is high, it is supposed that the process A disappears.

Figure 13A:
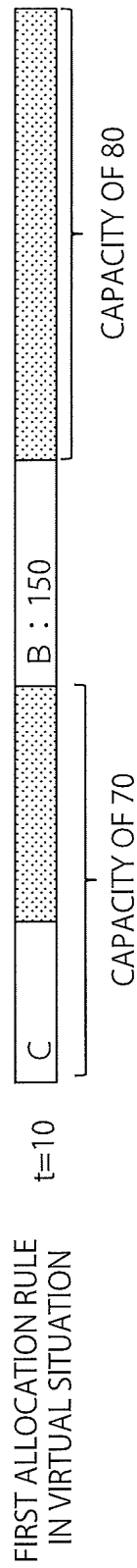
FIGS. 13A and 13B are drawings illustrating an example of a second calculation result in a virtual situation.
Figure 13B:
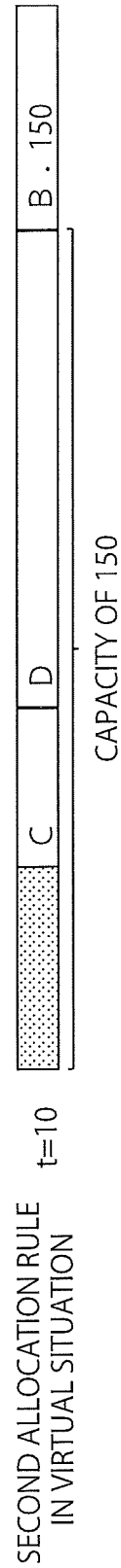

FIGS. 13A and 13B are drawings illustrating an example of the second calculation result in the virtual situation. It is noted that a number "150" in the allocation area in FIGS. 13A and 13B represents the remaining duration of the corresponding process. FIG. 13A illustrates the review result based on the first cache rule. FIG. 13B illustrates the review result based on the second cache rule. In the first calculation result based on the first cache rule, the process B exists on the immediate right of the process A. Therefore, when the process A disappears, two free spaces having the capacity of 70 and the capacity of 80 are generated. The process D having the capacity of 90 among the process C and the process D included in the second subset is not allocated, and only the process C having the capacity of 30 is allocated to the left end as illustrated in FIG. 13A. On the other hand, in the first calculation result based on the second cache rule, the process B exists on the right end of the cache. Therefore, when the process A disappears, a single free space having the capacity of 150 is generated. Therefore, as illustrated in FIG. 13B, both the process D and the process C are allocated.

The evaluator 124 evaluates the second calculation result in the virtual situation similarly as in the second calculation result in the actual situation. In the example of FIGS. 13A and 13B, the review result based on the first cache rule is evaluated as the score of 30, and the review result based on the second cache rule is evaluated as the score of 120. Therefore, the decider 125 adopts the review result based on the second cache rule and decides the position of the process B as the right end of the cache.

It is noted that the second calculation may be performed by including the process that has been supposed to disappear in the second subset in the virtual situation. According to the above-described example, since it is supposed that the process A disappears, the process A may be added to the second subset, and the second calculation may be performed using the three processes including the process A, the process C, and the process D. In the above-mentioned case, the process A is arranged in the free capacity of 70 in FIG. 13A instead of the process C. It is noted that when the second calculation is ended in the virtual situation, the process A is deleted from the second subset, and the second subset is restored.

Figure 14:
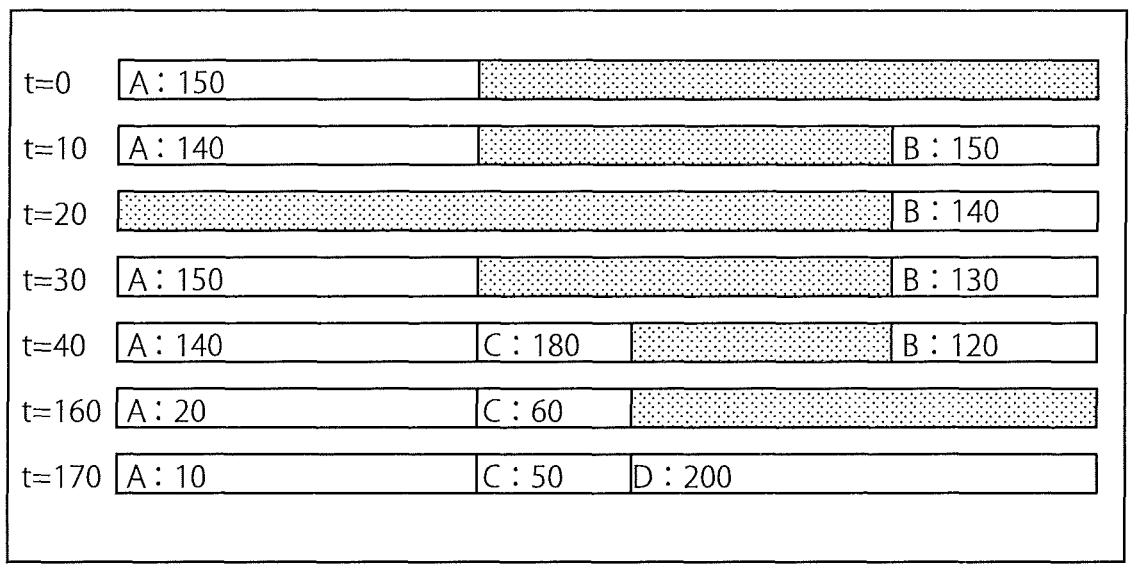
FIG. 14 is a drawing illustrating another example of the final allocation result.

FIG. 14 is a drawing illustrating another example of the final allocation result. At the time "t"=160, a single free space having the capacity of 90 exists as being different from FIG. 11A and FIG. 9B. For this reason, when the process D is generated at the time "t"=170, the process D is allocated to the free space. In this manner, the probability is increased that the process that is not allocated to the cache by simply using the left-alignment or right-alignment method can be allocated to the cache.

In this manner, since the information processing apparatus 1 can be used for various applications, it is noted that the application is not to be limited to a particular operation application.

Figure 15:
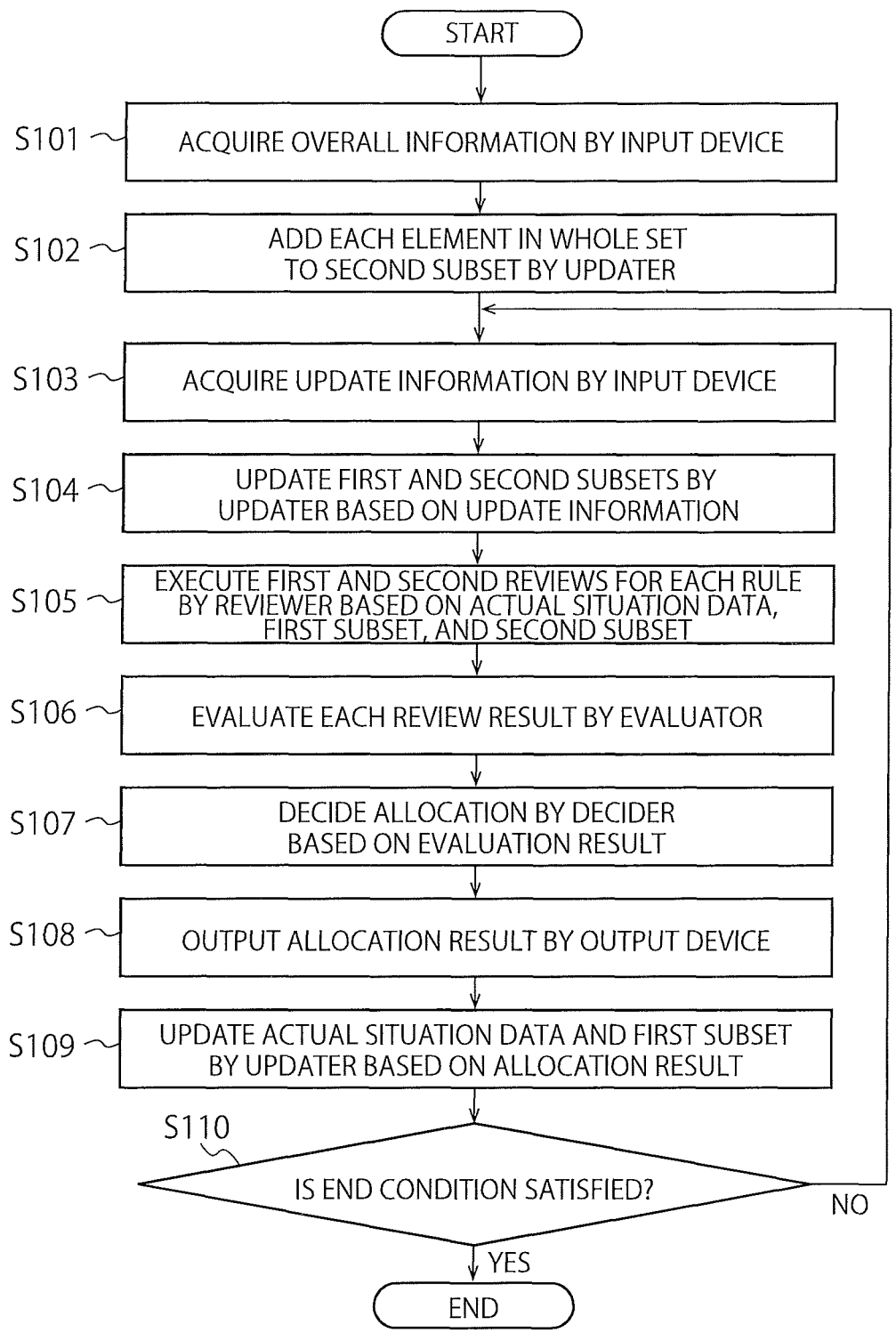
FIG. 15 is an outline flowchart for entire processing of the information processing apparatus according to the first embodiment.

Next, a flow of respective processes by the components will be described. FIG. 15 is an outline flowchart for entire processing of the information processing apparatus 1 according to the first embodiment. When the present flow is started, the first subset and the second subset are initialized, and it is assumed that the first subset and the second subset do not include elements.

The input device 121 acquires the overall information from the information provision apparatus (S101). The updater 122 adds the respective elements in the whole set to the second subset (S102). In other words, the first subset remains in an empty state. This state is maintained until the update information is acquired from the information provision apparatus.

The input device 121 acquires the update information from the information provision apparatus and recognizes an element to which the information may be allocated (S103). The updater 122 updates the first subset and the second subset by transferring the element to which the information may be allocated from the second subset to the first subset (S104). Since the element is added to the first subset, whether or not the information is to be allocated to the element in the first subset is reviewed.

The reviewer 123 executes the first calculation with respect to the first subset for each rule (S105), and executes the second calculation with respect to the plurality of results in the first calculation (S106). It is noted that in a case where the temporary storage site as illustrated in the example of FIG. 2 exists, whether or not suspension is performed is reviewed first, and in a case where the suspension is performed, the processing in S105 to S108 may be skipped, and the flow may shift to the output processing in S109. The evaluator 124 evaluates each of the review results by the reviewer 123, for example, by calculating a score or the like (S107). The decider 125 decides the element to which the information is to be allocated and the information to be allocated by selecting one of the plurality of review results on the basis of the evaluation results (S108).

The output device 126 then outputs the allocation result (S109). In response to the output, the worker or an operation device such as a robot arm performs the operation.

The updater 122 updates the actual situation data and the first subset on the basis of the allocation result (S110). In a case where the information is allocated, the element to which the information is allocated is deleted from the first subset. It is noted that in a case where the information allocation is suspended, the update is not performed.

In a case where an end condition is not satisfied (NO in S111), for example, a case where the element still remains in the second subset, standing-by occurs again, and when the next update information is transmitted from the information provision apparatus, the processing in S103 to S109 is repeated. In a case where the end condition is satisfied (YES in S111), for example, a case where the information is allocated to all the elements included in the whole set and no elements remain in the second subset, the processing is completed. It is noted that an elapsed time since the first package is packed or the like may be set as the end condition, and the processing may be completed even when the element remains in the second subset.

It is noted that the present flowchart is an example, and the processing order or the like is not limited as long as the necessary processing result can be acquired. For example, before the processing for the output device 126 to output the allocation result (S109), the processing for the updater 122 to update the first subset may be performed (S110). In a case where the input device 121 acquires the information of the next update element before the allocation result is output, the processing is interrupted, and the flow may return to the processing for the updater 122 to update the first and second subsets (S104). The reviewer 123 may perform the processing with respect to each of the rules in parallel or in turn. The processing result of each processing may be sequentially stored in the storage 111, and each of the components may acquire the processing result by referring to the storage 111.

It is noted that when the processing based on each of the rules is allocated to respective cores of a central processing unit (CPU) of the computer device that realizes the information processing apparatus 1, a calculation time period can be shortened.

As described above, the information processing apparatus 1 according to the present embodiment classifies each of the elements to which the information is allocated into the first subset constituted by the elements in which the information allocation may be performed at the present time and the second subset constituted by the elements in which the information allocation is not performed at the present time. The reviews with regard to the information to be allocated are separately performed in the first calculation with respect to the first subset and the second calculation with respect to the second subset. Accordingly, even in a case where the order to allocate the information is not optionally decided, the probability that the purpose is achieved is increased.

Second Embodiment

Figure 16:
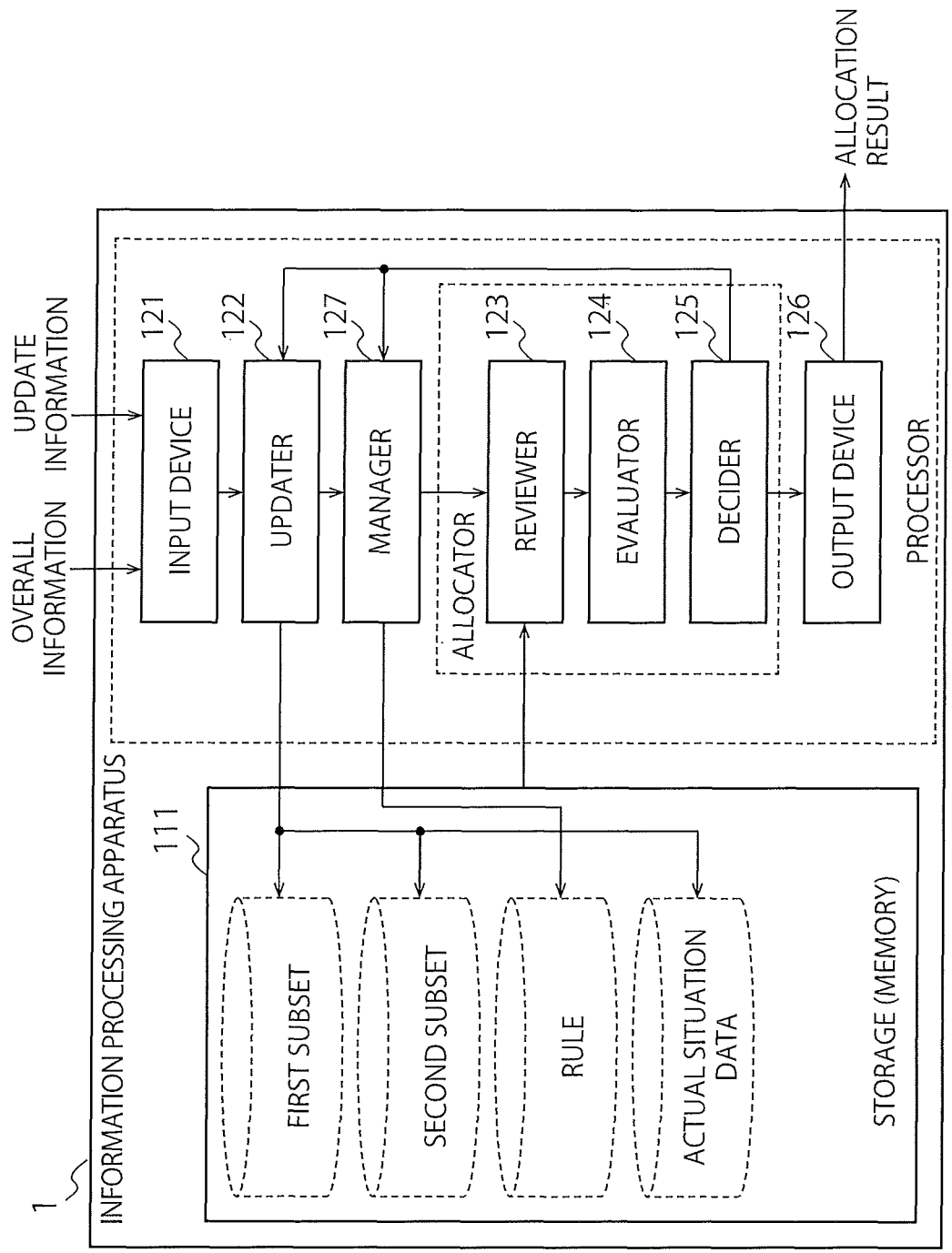
FIG. 16 is a block diagram illustrating an example of the information processing apparatus according to a second embodiment.

FIG. 16 is a block diagram illustrating an example of an information processing system according to a second embodiment. The information processing apparatus 1 according to the second embodiment further includes a manager 127 with respect to the first embodiment.

Since the information processing apparatus 1 can be used for various objects, it is supposed that rules to be used may also be diverse. However, when the number of used rules is high, an increase in processing load or the like is caused. Therefore, only an appropriate rule is preferably used instead of using all the usable rules. In view of the above, according to the present embodiment, the manager 127 manages the rules.

For example, the rule that is to be executed may be instructed from a user of the information processing apparatus 1 to the manager 127 via the input device 121. The manager 127 causes the storage 111 to store whether or not each of the rules is to be used. Before the review by the reviewer 123 is executed, the manager 127 instructs the reviewer 123 to use only the rule permitted to be used. As an alternative configuration, when the reviewer 123 extracts the rule from the storage 111, whether or not each of the rules is to be used may be read, and only the rule permitted to be used may be extracted.

The manager 127 may select a rule appropriate to the application. For example, in a case where performance of the processing related to the packing of the packages is specified via the input device 121, the manager 127 selects a rule related to the packing of the packages. In this case, the user does not need to determine whether or not any one of the registered rules is appropriate with respect to the application to be used from this time point, and burden on the user can be alleviated. It is noted that a relationship between the application and the rule is stored in the storage 111 in advance.

The manager 127 may determine whether or not the rule is necessary on the basis of a final use frequency of each of the rules and specify only the necessary rule to the reviewer 123. For example, when the information to be allocated is decided, the decider 125 transmits the rule used for the decision to the manager 127. The manager 127 counts the number of times for each of the rules to be used for the decision which is recoded as statistic information. The manager 127 may determine whether or not each of the rules is to be used on the basis of the count. For example, the manager 127 may determine that the rule having the count lower than a predetermined threshold is not used. As an alternative configuration, the manager 127 may determine that the first packing rule is not used when a ratio of the number of times for the first packing rule to be used to a total of a use count of all of the rules is lower than a threshold. In this manner, a part of the plurality of rules stored in the storage 111 may be selected on the basis of the number of times for each of the plurality of rules to be used for deciding the information to be allocated, and the information to be allocated may be decided using the selected rule. Accordingly, advantages such as shortening of the processing time period and suppression of the processing load are attained.

The processing time period may be suppressed while the manager 127 does not select the rule in which the processing time period is too long. For example, when the first calculation and the second calculation are performed, the reviewer 123 measures the processing time period to be recorded as the statistic information. A part is then selected from among the plurality of rules on the basis of the time spent for any one of the first calculation, the second calculation, and both. For example, in a case where the time spent for the first calculation or the second calculation exceeds a predetermined threshold related to the first calculation or the second calculation, the manager 127 may decide that the rule is not used. As an alternative configuration, in a case where the time period spent for both the first calculation and the second calculation, that is, a total of the time period spent for the first calculation and the time period spent for the second calculation exceeds a predetermined threshold, the manager 127 may decide that the rule is not used. In this manner, a part of the plurality of rules stored in the storage 111 may be selected on the basis of the time period spent for any one of the first calculation, the second calculation, and both in the plurality of respective rules, and the information to be allocated may be decided using the selected rule. Accordingly, dissatisfaction or the like of the user which is caused when the processing time period is too long can be eliminated. The measurement of the processing time period can be realized by using a function included in an operating system (OS) or the like of a computer.

It is noted that the selection by the manager 127 may be changed each time the allocation result is calculated. For example, in a case where a rule indicating that "all allocation combinations are enumerated" exists, when the number of elements set as the allocation objects is high, the calculation based on the rule takes a long period of time. For this reason, a configuration may be adopted in which the manager 127 does not select the rule during a period in which it is expected that the calculation time period is long, and the manager 127 selects the rule in which it is expected that the calculation time period is short. It is conceivable to determine a duration of the calculation time period on the basis of the number of elements set as the allocation objects. For example, the number of elements set as the allocation objects is below a predetermined threshold, the calculation time period may be determined to be short. As an alternative configuration, it may be determined whether or not the selection can be made on the basis of a ratio of the current number to the initial number of elements set as the allocation objects. For example, a configuration may be adopted in which the above-described rule is not selected until the current number becomes half of the initial number or lower.

It is noted that it is not necessary to have a more satisfactory result as the number of the rules used for the review is higher. Therefore, the review may be performed by changing a combination of the rules to be used to compare the review results with each other. The rule that adversely affects the review result may be identified, and use of the identified rule may be avoided. For example, in a case where first to third rules exist, the manager 127 generates a first rule set including the first to third rules and a second rule set including the first rule and the second rule without including the third rule. It is noted that the rule to be included in the rule set may be appropriately set. The allocator then decides the information to be allocated with respect to each of the rule sets, and the manager 127 compares the information to be allocated with respect to each of the rule sets. In a case where the review result based on the second rule set without including the third rule is more satisfactory, the manager 127 learns that an importance of the third rule is low, and a probability that the third rule is to be selected is decreased. For example, a priority with which a rule having a higher priority is more likely to be selected is previously set for each rule, and it is conceivable that the manager 127 decreases the priority with respect to the selected rule determined to have a low importance. In this manner, the plurality of rule sets having the different rules included therein may be generated. The information to be allocated may be decided for each of the plurality of rule sets, and a part of the plurality of rules stored in the storage 111 may be selected on the basis of the information to be allocated based on each of the plurality of rule sets. In other words, the satisfactory rule may be learnt from the plurality of rules, and after the learning, the review may be performed using only the satisfactory rule. In addition, after the learning, the review may be performed again using the rule determined to be unsatisfactory, and the evaluation with respect to the rule may be revised.

The manager 127 may accept addition of a new rule from the user via the input device 121 and store the new rule in the storage 111. The manager 127 may also extract the existing rule specified via the input device 121 from the storage 111 and perform editing or deletion of the rule. Accordingly, such an operation: can be performed that the information processing apparatus 1 is customized in accordance with the application, a latest rule is introduced, and the like.

The processing by the manager 127 may be executed before the reviewer 123 performs the first calculation using the rule (S105 in FIG. 15). An outline flowchart for the entire processing by the information processing apparatus according to the second embodiment will be skipped.

As described above, the information processing apparatus 1 according to the present embodiment can manage the plurality of rules and narrow down the rules used for the review. Accordingly, it is possible to attain the advantages such as improvement in usability of the user and suppression in the processing load of the apparatus. In addition, the information processing apparatus 1 can be made versatile since the rule can be freely added and deleted.

It is noted that at least a part of the above-described embodiments may be realized by a dedicated-use electronic circuit (that is, hardware) such as an integrated circuit (IC) to which a processor, a memory, and the like are mounted. In addition, a part of the above-described embodiments may be realized by executing software (program). For example, a general-use computer device is basically used as the hardware, and the processor such as the CPU mounted to the computer device is caused to execute the program, so that the processing according to the above-described embodiments can be realized.

For example, when the dedicated-use software stored in a computer-readable storage medium is read out by the computer, the computer can be caused to function as the apparatus according to the above-described embodiments. A type of the storage medium is not particularly limited. When the computer installs the dedicated-use software downloaded via a communication network, the computer can be caused to function as the apparatus according to the above-described embodiments. In this manner, the information processing by the software is specifically implemented using the hardware resources.

Figure 17:
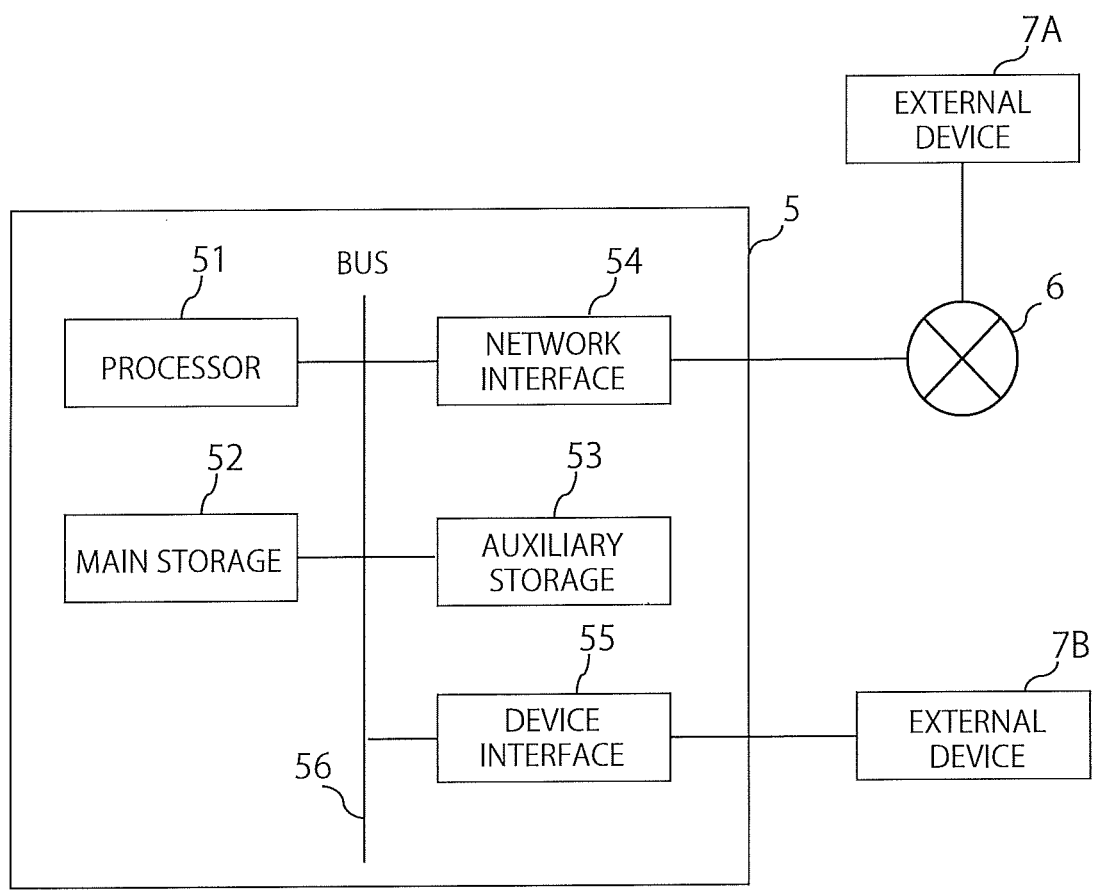
FIG. 17 is a block diagram illustrating an example of a hardware configuration according to one embodiment of the present invention.

FIG. 17 is a block diagram illustrating an example of a hardware configuration according to one embodiment of the present invention. The information processing apparatus 1 includes a processor 51, a main storage 52, an auxiliary storage 53, a network interface 54, and a device interface 55, and can be realized as a computer device 5 in which these components are connected to one another via a bus 56. The storage 111 can be realized by the main storage 52 or the auxiliary storage 53, and components such as the allocator other than the storage 111 are realized by the processor 51.

It is noted that the computer device 5 in FIG. 17 includes one each of the components but may also include plural pieces of the same component. FIG. 17 illustrates the single computer device 5, but the software may be installed in a plurality of computer devices, and the plurality of respective computer devices may execute a different part of the processing of the software.

The processor 51 is an electronic circuit including a controller and a processor of the computer. The processor 51 performs the operation processing on the basis of the data or the program input from each of the devices serving as the internal configurations of the computer device 5, and outputs an operation result or a control signal to each of the devices. Specifically, the processor 51 executes the operating system (OS) of the computer device 5, an application, or the like, and controls each of the devices constituting the computer device 5. The processor 51 is not particularly limited to the above as long as the above-described processing can be performed.

The main storage 52 is a storage that stores a command executed by the processor 51, various data, and the like, and the information stored in the main storage 52 is directly read out to the processor 51. The auxiliary storage 53 is a storage other than the main storage 52. It is noted that these storages mean any electronic parts that can store electronic information and may be a memory or a storage. The memory includes a volatile memory and a non-volatile memory, but any one of the memories may be used.

The network interface 54 is an interface for establishing connection to the communication network 6 in a wireless or wired manner. An interface in conformity to a related-art communication regulation may be used as the network interface 54. Exchange of the information with an external device 7A that establishes communication connection via the communication network 6 may be performed by the network interface 54.

The device interface 55 is an interface such as a USB directly connected to an external device 7B. The external device 7B may be an external storage medium or may also be a storage such as a database.

The external devices 7A and 7B may be output devices. The output device may be, for example, a display that displays an image, or a device that outputs sound or the like. For example, the output device includes a liquid crystal display (LCD), a cathode ray tube (CRT), a plasma display panel (PDP), a speaker, and the like, but are not limited to these.

It is noted that the external devices 7A and 7B may be input devices. The input device includes devices such as a keyboard, a mouse, and a touch panel, and supplies the information input by these devices to the computer device 5. The signal from the input device is output to the processor 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus that allocates information to respective elements included in a first set, the information processing apparatus comprising:
   a hardware processor configured to allocate the information to at least one of the element included in a first subset by using the first subset and a second subset, wherein
   the first subset is constituted by elements which are included in the first set and in which information allocation is to be performed at a present time, and
   the second subset is constituted by elements which are included in the first set and in which the information allocation is not performed at the present time, and wherein
   when allocating the information, the hardware processor:
   performs a first calculation for calculating candidates of the information to be allocated to the respective elements included in the first subset for each of a plurality of rules,
   performs a second calculation for calculating candidates of the information to be allocated to the respective elements included in the second subset with respect to a plurality of results of the first calculation, and
   decides the information to be allocated on the basis of a plurality of results of the second calculation.

2. The information processing apparatus according to claim 1, wherein the processor further:
   acquires update information for updating the elements in the first subset and the second subset, and
   performs an update on the first subset and the second subset on the basis of the update information or a result of the information allocation,
   wherein each time an element is added to the first subset by the update, the processor allocates the information to at least one element included in the first subset using the updated first subset and the updated second subset, and intermittently allocates the information to the respective elements included in the first set.

3. The information processing apparatus according to claim 1, further comprising:
   a memory or storage configured to store the plurality of rules; and wherein
   the processor further performs addition of a new rule, or editing or deletion of an existing rule with respect to the memory or the storage.

4. The information processing apparatus according to claim 1, wherein the processor further:
   selects a part from among the plurality of rules on the basis of the number of time for each of the plurality of rules to be used for deciding the information to be allocated, and
   decides the information to be allocated using the selected rule.

5. The information processing apparatus according to claim 1, wherein the processor further:
   selects a part from among the plurality of rules on the basis of a time period spent for any one of the first calculation, the second calculation, and both for each of the plurality of rules, and
   decides the information to be allocated using the selected rule.

6. The information processing apparatus according to claim 1, wherein the processor further:
   generates a plurality of rule sets including at least a part of the plurality of rules,
   decides the information to be allocated for each of the plurality of rule sets,
   selects a part from among the plurality of rules on the basis of the information to be allocated for the plurality of respective rule sets, and
   decides the information to be allocated using the selected rule.

7. The information processing apparatus according to claim 1, wherein the processor further:
   decides suspension of the information allocation in a case where a predetermined condition is satisfied; and wherein
   the elements included in the first set when the suspension is decided remain in the first set also when the information allocation is performed the next time.

8. The information processing apparatus according to claim 1, further comprising:
   an output device configured to output the decided information.

9. An information processing method for allocating information to respective elements included in a first set, the information processing method comprising:
   allocating, by a hardware processor, the information to at least one of the element included in a first subset by using the first subset and a second subset, wherein
   the first subset is constituted by elements which are included in the first set and in which information allocation is to be performed at a present time, and
   the second subset is constituted by elements which are included in the first set and in which the information allocation is not performed at the present time, and wherein
   said allocating the information comprising:

performing a first calculation for calculating candidates of the information to be allocated to the respective elements included in the first subset for each of a plurality of rules, performing a second calculation for calculating candidates of the information to be allocated to the respective elements included in the second subset with respect to a plurality of results of the first calculation, and deciding the information to be allocated on the basis of a plurality of results of the second calculation.

10. An information processing system that allocates information to respective elements included in a first set, the information processing system comprising:

an information provision apparatus comprising a hardware processor, configured to provide information related to elements which are included in the first set and in which information allocation is to be performed at a present time; and an information processing apparatus comprising a hardware processor, configured to allocate the information to the respective elements included in the first set on the basis of the information from the information provision apparatus, wherein the hardware processor of the information processing apparatus further:

acquires the information from the information provision apparatus, updates a first subset and a second subset on the basis of the information from the information provision apparatus, and decides the information to be allocated using the updated first subset and the updated second subset, and wherein the first subset is constituted by the elements which are included in the first set and in which the information allocation is to be performed at the present time, and wherein the second subset being constituted by elements which are included in the first set and in which the information allocation is not performed at the present time, and wherein, when allocating the information, the hardware processor of the information processing apparatus:

performs a first calculation for calculating candidates of the information to be allocated to the respective elements included in the first subset for each of a plurality of rules, performs a second calculation for calculating candidates of the information to be allocated to the respective elements included in the second subset with respect to a plurality of results of the first calculation, and decides the information to be allocated on the basis of a plurality of results of the second calculation.

* * * * *